United States Patent
Krogslund

(10) Patent No.: US 12,476,985 B1
(45) Date of Patent: Nov. 18, 2025

(54) METHOD AND SYSTEM FOR DETECTION OF UNDISCLOSED CYBER EVENTS

(71) Applicant: Interos Inc., Arlington, VA (US)

(72) Inventor: Christopher Michael Krogslund, Washington, DC (US)

(73) Assignee: Interos Inc., Arlington, VA (US)

(*) Notice: Subject to any disclaimer, the term of this patent is extended or adjusted under 35 U.S.C. 154(b) by 243 days.

(21) Appl. No.: 18/379,749

(22) Filed: Oct. 13, 2023

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
CPC .................. H04L 63/1416; H04L 41/16
See application file for complete search history.

(56) References Cited

U.S. PATENT DOCUMENTS

| | | |
|---|---|---|
| 7,657,942 B2 | 2/2010 | Himberger et al. |
| 8,195,489 B2 | 6/2012 | Bhamidipaty et al. |
| 9,009,837 B2 | 4/2015 | Nunez Di Croce |
| 9,501,647 B2 | 11/2016 | Yampolskiy et al. |
| 9,679,131 B2 | 6/2017 | Striem Amit |
| 9,774,626 B1 | 9/2017 | Himler et al. |
| 9,798,751 B2 | 10/2017 | Birdwell et al. |
| 10,387,657 B2 | 8/2019 | Belfiore, Jr. et al. |
| 10,438,001 B1 | 10/2019 | Hariprasad |
| 10,771,486 B2 | 9/2020 | Murphey et al. |
| 10,812,519 B2 | 10/2020 | Broda et al. |
| 10,956,566 B2 | 3/2021 | Shu et al. |
| 11,159,545 B2 | 10/2021 | Higbee et al. |

(Continued)

FOREIGN PATENT DOCUMENTS

| | | |
|---|---|---|
| CN | 111935134 A | 11/2020 |
| CN | 110460600 B | 9/2021 |

(Continued)

OTHER PUBLICATIONS

English language abstract and machine-assisted English translation for CN 111935134 A extracted from espacenet.com database on Oct. 16, 2023, 20 pages.

(Continued)

*Primary Examiner* — Anh Nguyen
(74) *Attorney, Agent, or Firm* — Howard & Howard Attorneys PLLC

(57) ABSTRACT

A computer-implemented method for detection of unreported cyber events experienced by an entity of interest is provided. The method includes instructions including obtaining training data related to estimating historical cyber health of a plurality of entities, training a neural network on the training data to create a trained neural network, and utilizing the trained neural network to generate a predicted number of cyber events experienced by the entity of interest during a time period. The instructions further include monitoring a reported number of cyber events experienced by the entity of interest during the period and generating a predicted unreported number of cyber events experienced by the entity of interest during the period based upon comparing the predicted number of cyber events experienced by the entity of interest during the period to the reported number of cyber events experienced by the entity of interest during the period.

20 Claims, 7 Drawing Sheets

(56) References Cited

U.S. PATENT DOCUMENTS

| | | |
|---|---|---|
| 11,165,800 B2 | 11/2021 | Thampy |
| 11,277,390 B2 | 3/2022 | Verzun et al. |
| 11,418,531 B2 | 8/2022 | Olalere |
| 11,470,108 B2 | 10/2022 | Lee et al. |
| 11,509,682 B1 | 11/2022 | Paget et al. |
| 2008/0016563 A1 | 1/2008 | McConnell et al. |
| 2009/0259748 A1 | 10/2009 | McClure et al. |
| 2015/0088597 A1 | 3/2015 | Doherty et al. |
| 2018/0270265 A1 | 9/2018 | Sage |
| 2018/0295149 A1* | 10/2018 | Gazit ............... H04L 63/1408 |
| 2019/0190952 A1 | 6/2019 | Cherry |
| 2019/0222604 A1 | 7/2019 | Vaidya et al. |
| 2020/0387773 A1 | 12/2020 | Verzi et al. |
| 2021/0034656 A1 | 2/2021 | Klein, Jr. et al. |
| 2021/0256392 A1 | 8/2021 | Chen et al. |
| 2021/0334656 A1* | 10/2021 | Sjögren ................. G06N 3/08 |
| 2022/0030009 A1 | 1/2022 | Hasan |
| 2022/0060499 A1 | 2/2022 | Huda |
| 2022/0253699 A1 | 8/2022 | Hoshen et al. |
| 2022/0311796 A1 | 9/2022 | Doyle et al. |
| 2022/0327108 A1 | 10/2022 | Manolache et al. |
| 2022/0353286 A1 | 11/2022 | Bazalgette et al. |
| 2023/0041534 A1 | 2/2023 | Jakobsson et al. |

FOREIGN PATENT DOCUMENTS

| | | | |
|---|---|---|---|
| CN | 113360896 B | | 9/2022 |
| CN | 115130708 A | * | 9/2022 ............... G06N 3/08 |
| EP | 2689331 B1 | | 10/2016 |

OTHER PUBLICATIONS

English language abstract and machine-assisted English translation for CN 110460600 B extracted from espacenet.com database on Oct. 16, 2023, 6 pages.

English language abstract and machine-assisted English translation for CN 113360896 B extracted from espacenet.com database on Oct. 16, 2023, 14 pages.

Schuman, Catherine D. et al., "Spatiotemporal Classification Using Neuroscience-Inspired Dynamic Architectures", Biologically Inspired Cognitive Architectures, vol. 14, 2014, pp. 1-9.

* cited by examiner

METHOD AND SYSTEM FOR DETECTION OF UNDISCLOSED CYBER EVENTS

BACKGROUND

Companies and organizations operate computerized server devices or servers to maintain an online presence. Customers and/or the consuming public may use the Internet to purchase goods and services through the servers. Access to a company or organization through a server has beneficial effects, including sales, advertising, and increased public awareness of the offerings of the company or organization.

Access to a company or organization through a server may have deleterious effects. Cybercrime is a serious problem for companies and organizations. Bad actors may commit cyber events to act fraudulently, steal information, and gain access to sensitive portion of the company or organization.

If a first company or organization (i.e., a first entity) does business with a second company or organization (i.e., a second entity), the well-being of the first entity may depend upon whether the second entity is compromised by cybercrime. The first entity may be affected by fraudulent orders placed with the second entity. Sensitive information of the first entity held by the second entity may be revealed or ransomed. The first entity may depend upon a flow of products or services from the second entity, and cybercrime may affect the second entity's ability to deliver the required products or services in a timely manner. Cybercrime may affect the reputation of the second entity, and the first entity may be sensitive to the affect spreading from the second entity to the first entity.

SUMMARY

This Summary introduces a selection of concepts in a simplified form that are further described below in the Detailed Description below. This Summary is not intended to limit the scope of the claimed subject matter nor identify key features or essential features of the claimed subject matter.

According to a first aspect, a computer-implemented method for detection of unreported cyber events experienced by an entity of interest is provided. The computer-implemented method includes instructions, including obtaining training data related to historical cyber health of a plurality of entities, wherein each of the plurality of entities includes a company or organization; training a neural network on the training data to create a trained neural network; utilizing the trained neural network to generate a predicted number of cyber events experienced by the entity of interest during a time period; monitoring a reported number of cyber events experienced by the entity of interest during the time period; and generating a predicted unreported number of cyber events experienced by the entity of interest during the time period based upon comparing the predicted number of cyber events experienced by the entity of interest during the time period to the reported number of cyber events experienced by the entity of interest during the time period.

According to a second aspect, a non-transitory computer-readable medium is provided to implement the features of the first aspect.

According to a third aspect, a system for detection of unreported cyber events experienced by an entity of interest is provided to implement the features of the first aspect.

Any of the above aspects can be combined, in whole or in part.

Any of the above aspects can be combined, in whole or in part, with any of the following implementations:

The neural network may include a deep neural network or a convolutional neural network.

Obtaining the training data may include obtaining cybersecurity data for each of the plurality of entities and transforming the cybersecurity data for each of the plurality of entities into a plurality of images, wherein each image is configured for conveying the cybersecurity data for one of the plurality of entities. Training the neural network on the training data may include utilizing the plurality of images to train the neural network.

Obtaining the cybersecurity data for each of the plurality of entities may include receiving a dataset including real-world historical cybersecurity data including covariates/features observed for each of the plurality of entities and utilizing the dataset as the cybersecurity data.

Obtaining the cybersecurity data for each of the plurality of entities may include receiving a first dataset including real-world historical cybersecurity data including covariates/features observed for each of the plurality of entities and receiving a second dataset including historical cyber events that occurred to each of the plurality of entities. Obtaining the cybersecurity data for each of the plurality of entities may further include utilizing the second dataset to sort the first dataset into to subsets including a first subset describing a positive class including a first portion of the real-world historical cybersecurity data corresponding to periods wherein cyber events occurred and a second subset describing a negative class including a second portion of the real-world historical cybersecurity data corresponding to periods wherein no known cyber event occurred. Obtaining the cybersecurity data for each of the plurality of entities may further include creating a single composite training dataset based upon the first subset and the second subset and utilizing the single composite training dataset as the cybersecurity data.

Obtaining the cybersecurity data for each of the plurality of entities may include receiving a first dataset including real-world historical cybersecurity data including covariates/features observed for each of the plurality of entities and receiving a second dataset including historical cyber events that occurred to each of the plurality of entities. Obtaining the cybersecurity data for each of the plurality of entities may further include utilizing the second dataset to sort the first dataset into to subsets including a first subset describing a positive class including a first portion of the real-world historical cybersecurity data corresponding to periods wherein cyber events occurred and a second subset describing a negative class including a second portion of the real-world historical cybersecurity data corresponding to periods wherein no known cyber event occurred. Obtaining the cybersecurity data for each of the plurality of entities may further include training a first generative adversarial network to create a first simulated set of entity date-time covariate/feature observations configured to share empirical properties with the first subset. Obtaining the cybersecurity data for each of the plurality of entities may further include training a second generative adversarial network to create a second simulated set of entity date-time covariate/feature observations configured to share empirical properties with the second subset. Obtaining the cybersecurity data for each of the plurality of entities may further include creating a single composite training dataset based upon the first simulated set of entity date-time covariate/feature observations and the second simulated set of entity date-time covariate/ feature observations and utilizing the single composite training dataset as the cybersecurity data.

Obtaining the cybersecurity data for each of the plurality of entities may include receiving a first dataset including real-world historical cybersecurity data including covariates/features observed for each of the plurality of entities, generating a structured synthetic dataset based upon modeling to mimic the first dataset across a timespan, and utilizing the structured synthetic dataset as the cybersecurity data.

Obtaining the cybersecurity data for each of the plurality of entities may include receiving a first dataset including real-world historical cybersecurity data including covariates/features observed for each of the plurality of entities and receiving a second dataset including historical cyber events that occurred to each of the plurality of entities. Obtaining the cybersecurity data for each of the plurality of entities may further include utilizing the second dataset to sort the first dataset into to subsets including a first subset describing a positive class including a first portion of the real-world historical cybersecurity data corresponding to periods wherein cyber events occurred and a second subset describing a negative class including a second portion of the real-world historical cybersecurity data corresponding to periods wherein no known cyber event occurred. Obtaining the cybersecurity data for each of the plurality of entities may further include training a first generative adversarial network to create a first simulated set of entity date-time covariate/feature observations configured to share empirical properties with the first subset and training a second generative adversarial network to create a second simulated set of entity date-time covariate/feature observations configured to share empirical properties with the second subset. Obtaining the cybersecurity data for each of the plurality of entities may further include generating a structured synthetic dataset based upon modeling to mimic the first dataset across a timespan, creating a single composite training dataset based upon the first subset, the second subset, the first simulated set of entity date-time covariate observations, the second simulated set of entity date-time covariate observations, and the structured synthetic dataset, and utilizing the single composite training dataset as the cybersecurity data.

Transforming the cybersecurity data for each of the plurality of entities into the plurality of images may include creating a plurality of individual images for each of the plurality of entities, including ordering cybersecurity data in a first dimension according to a date-time of each observation and ordering covariate/feature observations along a second dimension in a random configuration.

Transforming the cybersecurity data for each of the plurality of entities into the plurality of images may further include mapping the plurality of individual images for each of the plurality of entities onto an entity-specific template image to create an entity-specific overview image for each of the plurality of entities. Utilizing the plurality of images to train the neural network may include utilizing the entity-specific overview image for each of the plurality of entities to train the neural network.

Utilizing the entity-specific overview image for each of the plurality of entities to train the neural network may include creating a subset of each entity-specific overview image based upon a temporal window of the overview image and the ordering of the covariates/feature observations along the second dimension and utilizing the subset of each entity-specific overview image to train one of a plurality of candidate convolutional neural networks. Utilizing the entity-specific overview image for each of the plurality of entities to train the neural network may further include evaluating operation of each of the plurality of candidate convolutional neural networks and selecting one of the plurality of candidate convolutional neural networks as the trained neural network based upon the evaluation.

Utilizing the trained neural network may include monitoring a technical indicator describing a measure of cyber health of the entity of interest and providing the technical indicator to the trained neural network as an input.

The technical indicator may include one or more if the following: a binary indication selected to indicate cybersecurity health; a measure of whether a web encryption certificate expiration date for a server operated by entity of interest has passed; a measure of whether a web encryption certificate expiration data for the server operated by entity of interest is within one week of expiration, within one month of expiration, or within six months of expiration; a measure of domain name system (DNS) security upon the server operated by entity of interest including domain hijacking prevention measures; a measure of email security upon the server operated by entity of interest including email authentication measures or email encryption measures; a measure of network filtering measures upon the server operated by entity of interest including measures to avoid unsafe network services or presence of internet of things (IoT) devices; a measure of software patching upon the server operated by entity of interest including application server patching, open secure sockets layer (OpenSSL) patching, content management system (CMS) patching, or web server patching; a measure of system hosting upon the server operated by entity of interest including hosting fragmentation; a measure of threat intelligence monitoring upon the server operated by entity of interest including monitoring data regarding botnet hosts, monitoring data regarding command-and-control servers, monitoring data regarding host hacking, monitoring data regarding host scanning, monitoring data regarding host phishing, monitoring data regarding host spamming, or monitoring data regarding host blacklisting; a measure of web encryption upon the server operated by entity of interest including a certification expiration date, a certificate valid date, a certificate subject, an encryption hash algorithm, an encryption key length, or encryption protocols; a measure of web application security upon the server operated by entity of interest including CMS authentication, hypertext transfer protocol (HTTP) security headers, or malicious code; a trend-describing measurable monitored upon the server operated by entity of interest including a DNS security trend, a threat intelligence trend, an email security trend, a system hosting trend, a web encryption trend, a web application security trend, a network filtering trend, or a software patching trend; a measurable related to use of a software-as-a-service bill of materials (SaaSBOM) upon the server operated by entity of interest including a measure of vulnerable technologies detected, a measure of vulnerabilities detected, an average common vulnerabilities and exposures (CVE) base score, an average CVE exploitability score, or an average CVE impact score; a measure of threat actors interacting with the server operated by entity of interest including a measure of attack techniques detected, a measure of advanced persistent threat (APT) threats detected, or an average APT group score; a measure of data loss events including a measure of data loss in a last 6 months, a measure of data loss in a last 6-12 months, a measure of data loss in a last 12-24 months, a measure of data loss in a last 24-36 months, or a measure of data loss in a last 36 plus months; a measure of cyber events including a measure of occurrence of ransomware attacks, a measure of occurrence of wiper malware attacks, a measure of occurrence of unspecified cyberattacks, or a measure of occurrence of anomalous cyber indicators; an overall compliance measure including a measure of cybersecurity framework (CSF) compliance, a measure of International Organization for Standardization and an International Electrotechnical Commission (ISO/IEC) 27001 compliance, a measure of National Institute of Science and Technology Special Publication 800-53 (NIST SP 800-53) compliance, a measure of National Institute of Science and Technology Special Publication 800-171 (NIST SP 800-171) compliance, or a measure of Payment Card Industry Data Security Standard (PCI DSS) compliance; a measure of governance affecting the server operated by entity of interest including measures of domestic government coordination, legal institutional capacity, cyber strategy and policy maturity, cybercrime prosecution capacity, military cyber capacity, cyber policy implementation, or cyber intelligence analysis capacity; a measure of a business environment in a country in which the server operated by entity of interest operates including measures of private sector digital services data protection, digital protection of essential services, personal data protection, digital identity protection and compliance, domestic spyware, government mandated data access, or Internet blackouts; a measure of resilience of the country in which the server operated by entity of interest operates including measures of government technical capacity, security culture maturity, cyber crisis management capacity, cyber incident response capacity, or cyber education and professional development; a measure of digital infrastructure present in a country in which the server operated by entity of interest operates including a measure of Internet penetration, a measure of information and communication technology infrastructure capacity, a measure of rootserver diversification, a measure of submarine cable diversification, a measure of mobile connectivity, a measure of satellite diversification, a measure of data center diversification, a measure of Internet exchange diversification, or a measure of cloud infrastructure capacity; or a measure of international collaboration affecting the server operated by entity of interest, including an indication of whether country in which the server operated by entity of interest operates is a member of a Budapest Convention on Cybercrime, whether the country is a signatory on a Declaration for the Future of the Internet, whether the country is a member of a Freedom Online Coalition, and whether the country participates in an International Cybersecurity Forum.

Utilizing the trained neural network may include monitoring a plurality of technical indicators describing measures of cyber health of the entity of interest and providing the technical indicators to the trained neural network as an input.

Unreported cyber events experienced by the entity of interest may include cyber-attacks including phishing, ransomware, malware, denial-of-service, or man-in the middle attacks.

The method may further include the entity of interest operating a computerized server device. Utilizing the trained neural network to generate the predicted number of cyber events experienced by the entity of interest during the time period may include utilizing the trained neural network to generate a predicted number of cyber events that occurred on the computerized server device during the time period. Monitoring the reported number of cyber events experienced by the entity of interest during the time period may include monitoring a reported number of cyber events that occurred on the computerized server device during the time period. Generating the predicted unreported number of cyber events experienced by the entity of interest during the time period may include generating a predicted unreported number of cyber events that occurred on the computerized server device during the time period.

The neural network may be operated on a first computerized server device operated by a first entity and the entity of interest is a second entity. The predicted unreported number of cyber events experienced by the entity of interest during the time period may be configured for enabling the first entity to judge a risk that the second entity poses to the first entity.

The method may further include feeding back historical iterations of the method to further train the neural network.

The method may further include iteratively training the neural network with updated training data.

Any of the above features or steps can be fully automated.

Any of the above implementation can be combined in whole or in part.

Other features and advantages of the present disclosure will be readily appreciated, as the same becomes better understood, after reading the subsequent description taken in conjunction with the accompanying drawings.

DETAILED DESCRIPTION

Figure 1:
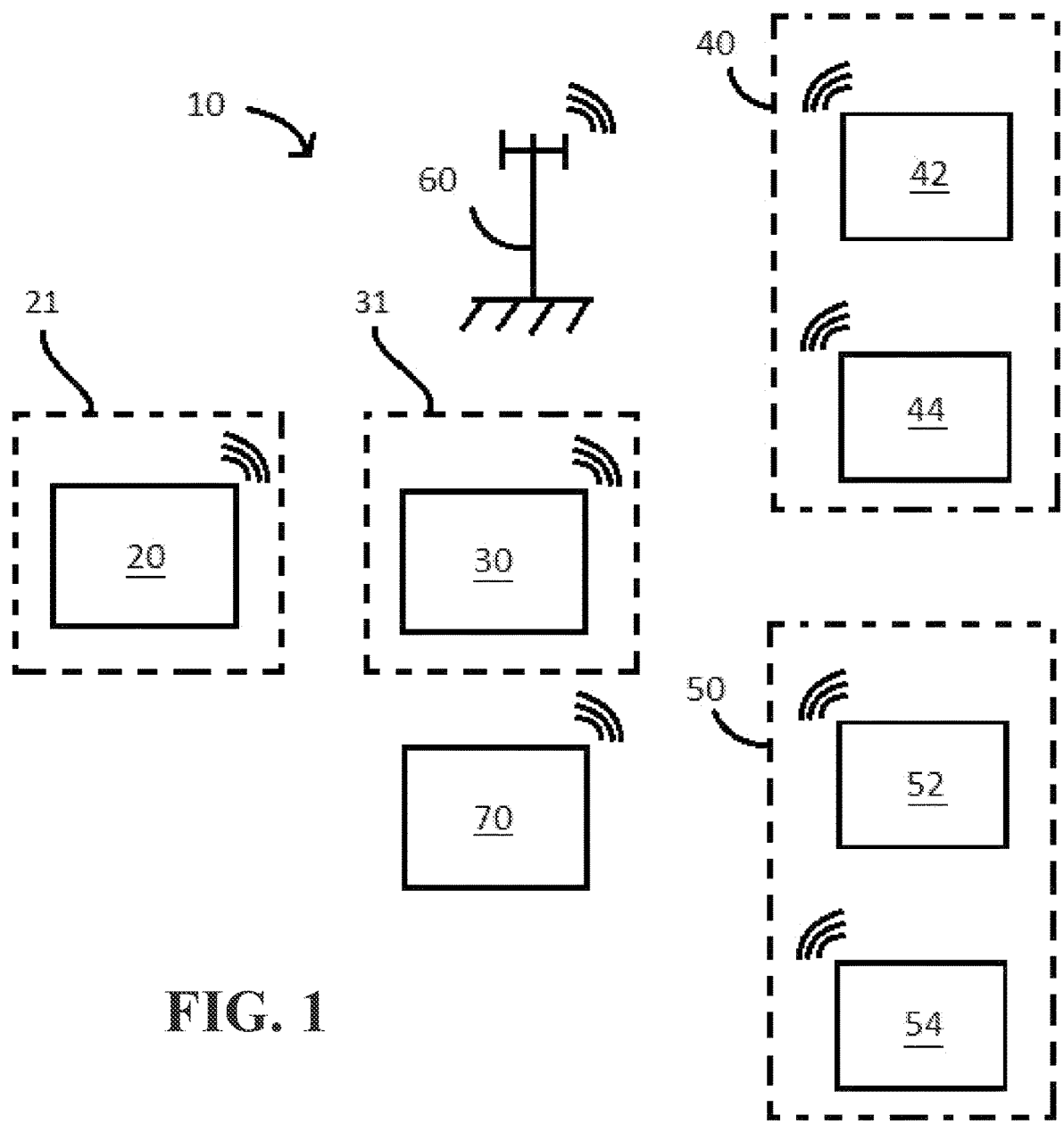
FIG. 1 schematically illustrates an exemplary system for detection of undisclosed cyber events, in accordance with the present disclosure.

Cyber events including cyber-attacks pose a threat to companies and organizations. Such entities may lose money, reputation, secret information, and other vital resources to cyber events. An entity may operate cybersecurity protocols and software to protect computerized server devices operated by that entity. However, business interactions are complicated. Entities rely upon each other, exchange sensitive information with each other, and may share success and failure together. The well-being of a first entity may depend upon the cyber health or cyber hygiene of a second entity.

An entity may not be truthful or forthcoming about its cyber health. Such weaknesses are embarrassing and may lose the entity business. Regardless of the embarrassment of the entity, other parties may still desire to know or predict the occurrence of cyber events upon the entity.

A method and system to estimate cyber health of an entity is provided. The method and system may estimate or predict a total number of cyber events that are experienced by the entity during a time period, monitor a reported number of cyber events experienced by the entity during the time period, and generate a predicted unreported number of cyber events experienced by the entity during the time period by subtracting the reported number of cyber events from the predicted total number of cyber events.

According to a first exemplary embodiment, a method for detection of unreported cyber events experienced by an entity of interest is provided. The method includes obtaining training data related to estimating historical cyber health of a plurality of entities. Each of the plurality of entities includes a company or organization. The method further includes training a neural network on the training data to create a trained neural network and utilizing the trained neural network to generate a predicted number of cyber events experienced by the entity of interest during a time period. The method further includes monitoring a reported number of cyber events experienced by the entity of interest during the time period and generating a predicted unreported number of cyber events experienced by the entity of interest during the time period based upon comparing the predicted number of cyber events experienced by the entity of interest during the time period to the reported number of cyber events experienced by the entity of interest during the time period.

According to a second exemplary embodiment, a method operated by a first entity for detection of unreported cyber events experienced by a second entity is provided. The method includes obtaining training data related to estimating historical cyber health of a plurality of entities. Each of the plurality of entities includes a company or organization. The method further includes, upon a first computerized server device operated by the first entity, operating an undisclosed cyber event tabulation module. The module includes programming to operate a neural network, train the neural network on the training data to create a trained neural network, and utilize the trained neural network to generate a predicted number of cyber events that occurred on a second computerized server device operated by the second entity during a time period. The module further includes programming to monitor a reported number of cyber events that occurred on the second computerized server device during the time period. The module further includes programming to generate a predicted unreported number of cyber events that occurred on the second computerized server device during the time period based upon comparing the predicted number of cyber events that occurred on the second computerized server device during the time period to the reported number of cyber events that occurred on the second computerized server device during the time period.

According to a third exemplary embodiment, a system for detection of unreported cyber events experienced by an entity of interest is provided. The system includes a computerized server device operating an undisclosed cyber event tabulation module. The module includes programming to obtain training data related to estimating historical cyber health of a plurality of entities. Each of the plurality of entities include a company or organization. The module further includes programming to train a neural network on the training data to create a trained neural network and utilize the trained neural network to generate a predicted number of cyber events experienced by the entity of interest during a time period. The module further includes programming to monitor a reported number of cyber events experienced by the entity of interest during the time period and generate a predicted unreported number of cyber events experienced by the entity of interest during the time period based upon comparing the predicted number of cyber events experienced by the entity of interest during the time period to the reported number of cyber events experienced by the entity of interest during the time period.

Definitions of a cyber event may vary. Each instance of a cyber-attack may be recordable as separate cyber event. In another embodiment, a plurality of cyber-attacks may be recordable as a single cyber event. For example, in a denial-of-service attack, thousands of individual attacks may be used to flood a server and prevent bona fide users from accessing the server. These thousands of individual attacks may occur in a short time period and may be recordable as a single cyber event.

The disclosed method and system lessen the dependence of customers, investors, or other interested parties on the statutory reporting requirements or good-will of a company to disclose cyber events with potentially material impact to its value or operations in a timely manner, if at all. The disclosed system and method provide customers, investors, or other interested parties with potentially material information about a cyber event impacting a company in real-time. Absent the disclosed system and method, customers, investors, or other interested parties might only receive notification days, weeks, or months after the event, if at all.

The disclosed system and method leverage technical cyber indicators in concert with real-world cyber event data allows for the detection regime to automatically adapt to innovations in attack vectors and techniques over time. The disclosed system and method include a composite training dataset including empirical, unstructured synthetic, and structured synthetic data. This composite training dataset overcomes many of the challenges in modeling cyber events (notably, true events/positive class observations are highly imbalanced relative to negative class observations.) The disclosed system and method include incorporation of structured synthetic data passed through an obfuscation process helps to recover real-world cyber events that are not fully observed (e.g., observations are rate limited, initial indications are unobserved, etc.) The disclosed system and method, including formation of pseudo images and training of convolutional neural networks, increases the ability to detect complex events present within panel data. Flexible optimization of temporal observation window and covariate/feature ordering creates more coherent renderings of complex events within panel data, improving event detection performance.

Referring now to the drawings, wherein like numerals indicate like or corresponding parts throughout the several views, FIG. 1 schematically illustrates an exemplary system 10 for detection of undisclosed cyber events. The system 10 is illustrated including a first server 20 operated by a first entity 21 and a second server 30 operated by a second entity 31. In one embodiment, the second entity 31 may be described as an entity of interest, and the second server 30 may be described as a server operated by the entity of interest. A plurality of bona fide users 40 including a first bona fide user 42 and a second bona fide user 44 is illustrated in wireless communication with the second server 30 of the second entity 31 through a wireless communication network 60. The plurality of bona fide users 40 may gather information, conduct business, or perform other online functions offered by operation of the second server 30 of the second entity 31. Additionally, a plurality of bad actors 50 including a first bad actor 52 and a second bad actor 54 is illustrated in wireless communication with the second server 30 of the second entity 31 through the wireless communication network 60. The plurality of bad actors 50 interacts with the second server 30 of the second entity 31 and may perpetrate cyber-attacks upon the second server 30 of the second entity 31. These cyber-attacks may include phishing, ransomware, malware, denial-of-service, man-in the middle, or other similar forms of attack. These cyber-attacks constitute cyber events experienced by the second entity 31 or cyber events that occur upon the second server 30 of the second entity 31.

The first entity 21 may have an interest in a second entity 31 operating the second server 30. For example, the first entity 21 may be a customer of the second entity 31. If cyber-attacks affect the second entity 31, a number of problems may occur for the first entity 21, such as an interruption of delivery of products or services from the second entity 31, damaging disclosure by the second entity 31 of secret information of the first entity 21, a loss of reputation of the second entity 31 spreading to a loss of reputation of the first entity 21, and other similar damages. In another embodiment, the first entity 21 may be a cyber-health monitoring company that rates the cyber-health of various companies. The first entity 21 may utilize the disclosed system 10 to estimate and publish ratings of various second entities 31. An ability of the first entity to estimate or predict a risk that cyber-attacks upon the second server 30 of the second entity 31 is a valuable service to the first entity 21 and enables the first entity to take remedial action, such as ceasing business with the second entity 31, demanding that the second entity 31 increase cyber-security precautions, or other similar actions.

The second entity 31 may be under a legal requirement or contractual obligation to report cyber-attacks. The second server 30 of the second entity 31 may report cyber-attacks directly to the first server 20 of the first entity 21. The requirement or obligation may include a threshold, for example, with only cyber-attacks of a certain type or level of risk being reportable. The second entity 31 may have some discretion whether to report certain cyber-attacks. The second entity 31 may have some dis-incentive to honestly report certain cyber-attacks. The second entity 31 may not be aware or may take some time to uncover occurrence of certain cyber-attacks. The disclosed system 10 enabling the first entity 21 to estimate or predict occurrence of unreported cyber events upon the second server 30 of the second entity 31 gives the first entity 21 an ability to evaluate the cyber-health of the second entity 31 without full disclosure or the cooperation of the second entity 31.

The second entity 31 may have some obligation to report cyber events to the first entity 21. For example, the second entity 31 may enter into a contract to supply goods or services to the first entity 21, and one of the terms of the contract may be that the second entity 31 is to report to the first entity 21 any cyber event that crosses a particular threshold (financial impact, actual data breach, evidence of repeated and ongoing efforts to breach, etc.) In another embodiment, the second entity 31 may voluntarily report such cyber events to a reporting company 70. The reporting company 70 may certify entities as complying with cybersecurity standards, and the second entity 31 may desire to achieve a high cybersecurity standard certification to boost reputation with other entities such as the first entity 21. The first entity 21 may recognize, monitor, or pay for information from the reporting company 70 pertaining to the cyber health of the second entity 31. In either direct reporting of the second entity 31 to the first entity 21 or in the second entity reporting to the reporting company 70, the reporting of cyber events that occurred through a time period by the second entity 31 may or may not be inclusive.

Figure 2:
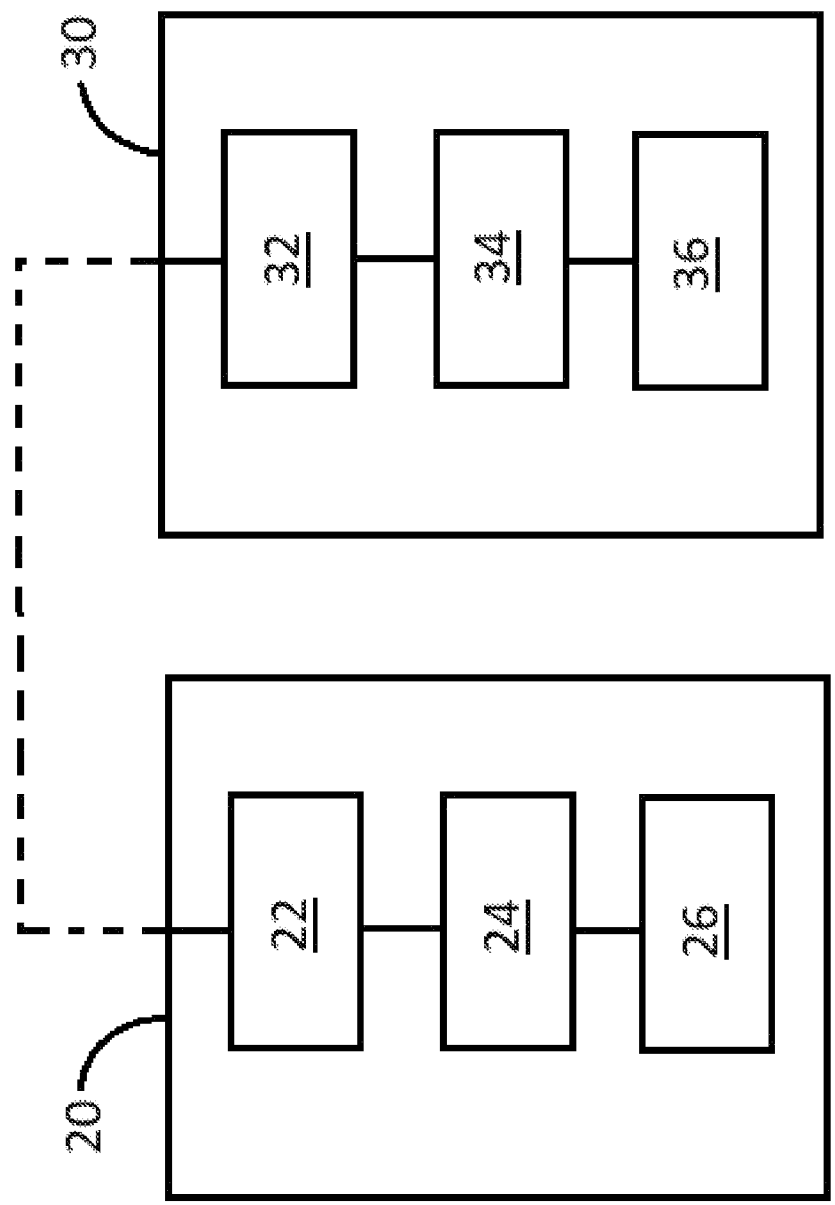
FIG. 2 schematically illustrates the server of the first entity and the server of the second entity of FIG. 1, wherein the server of the second entity includes a processor configured for evaluating and selectively reporting cyber events that occur on the server of the second entity and wherein the server of the first entity is configured for estimating undisclosed cyber events that have occurred on the server of the second entity, in accordance with the present disclosure.

FIG. 2 schematically illustrates the first server 20 of the first entity 21 and the second server 30 of the second entity 31 of FIG. 1. The second server 30 includes a computerized processor 34 configured for evaluating and selectively reporting cyber events that occur on the second server 30. The computerized processor 34 is configured for executing programmed code and includes random-access-memory (RAM). The computerized processor 34 may include one computerized device or may represent computing capacity spanning a plurality of physical devices. The second server 30 may further include a communications device 32 enabling the second server 30 to communicate with other computerized devices, for example, over the wireless communication network 60 of FIG. 1. The second server 30 may further include a storage device 36 such as a hard drive, durable flash memory, or other similar devices useful to store data.

The first server 20 includes a computerized processor 24 configured for predicting or estimating undisclosed cyber events that have occurred on the second server 30. The computerized processor 24 is configured for executing programmed code and includes RAM. The computerized processor 24 may include one computerized device or may represent computing capacity spanning a plurality of physical devices. The computerized processor 24 may be configured for operating programming modules executing a computerized method or a plurality of method steps or process steps. The first server 20 may further include a communications device 22 enabling the first server 20 to communicate with other computerized devices, for example, over the wireless communication network 60 of FIG. 1. The first server 20 may further include a storage device 26 such as a hard drive, durable flash memory, or other similar devices useful to store data.

Figure 3:
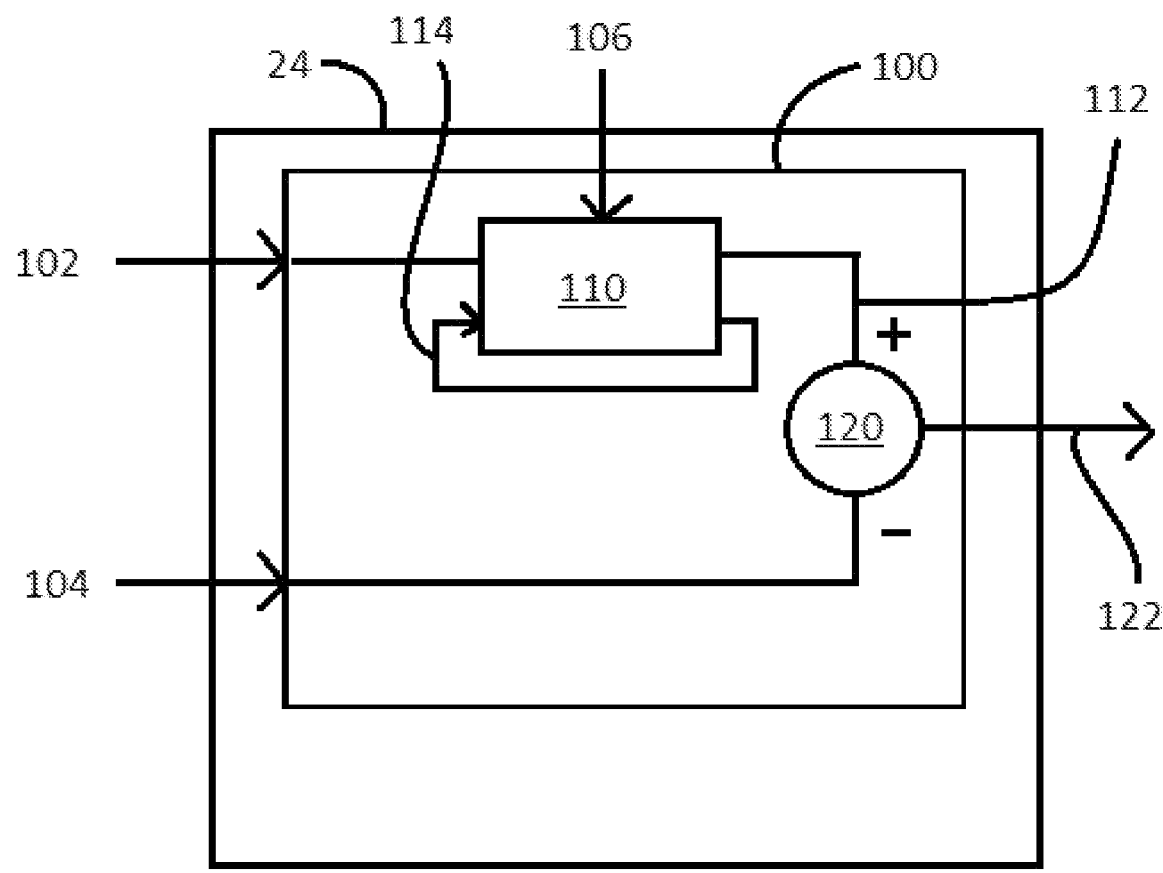
FIG. 3 schematically illustrates operation of the computerized processor of the server of the first entity of FIG. 2, including operation of an undisclosed cyber event tabulation module programmed within the computerized processor, in accordance with the present disclosure.

The computerized processor 24 of FIG. 2 may operate a programming module configured for predicting or estimating an occurrence of undisclosed cyber events on the second server 30. FIG. 3 schematically illustrates operation of the computerized processor 24 of the first server 20 of the first entity 21 of FIG. 2, including operation of an undisclosed cyber event tabulation module 100 programmed within the computerized processor 24. The undisclosed cyber event tabulation module 100 receives a plurality of inputs, including a least one technical indicator 102, a number of cyber-attacks reported by the second server 30 of the second entity 31 of FIG. 2, and neural network training data 106.

The technical indicator 102 may be alternatively described as a technical attribute or as an underlying attribute indicative of the cyber health or cyber hygiene of the second server 30 or the second entity 31. The undisclosed cyber event tabulation module 100 may receive a plurality of technical indicators 102. The technical indicator(s) 102 may include some metric or measurable related to operation of the second server 30 related to the cyber health or the cyber hygiene of the second server 30 or of the second entity 31. In one example, the technical indicators may include a web encryption certificate expiration date. This exemplary expiration date and other technical indicators may be used to train the model and make initial predictions from technical indications on whether a cyber event or how many cyber events over a time period are likely to have happened. Once a number of cyber events over a time period have been estimated or predicted, this number may be compared with a number of actually reported cyber events over the time period to estimate a number of unreported cyber events that occurred over the time period.

A number of technical indicators 102 may be monitored and utilized as inputs to the undisclosed cyber event tabulation module 100. A plurality of technical indicators 102 on a firm-level or entity-level may be described. Examples of technical indicators 102 on an entity level may include measures of domain name system (DNS) security including domain hijacking prevention measures; measures of email security including email authentication measures and email encryption measures; and network filtering measures including measures to avoid unsafe network services and presence of internet of things (IoT) devices. Examples of technical indicators 102 on an entity level may include software patching measurables including application server patching, open secure sockets layer (OpenSSL) patching, content management system (CMS) patching, and web server patching; system hosting including hosting fragmentation; and threat intelligence measurables including data regarding botnet hosts, data regarding command-and-control servers, data regarding host hacking, data regarding host scanning, data regarding host phishing, data regarding host spamming, and data regarding host blacklisting. Examples of technical indicators 102 on an entity level may include web encryption measurables including a certification expiration date, a certificate valid date, a certificate subject, an encryption hash algorithm, an encryption key length, and encryption protocols. Examples of technical indicators 102 on an entity level may include web application security measurables including CMS authentication, hypertext transfer protocol (HTTP) security headers, and malicious code; and trend-describing measurables including a DNS security trend, a threat intelligence trend, an email security trend, a system hosting trend, a web encryption trend, a web application security trend, a network filtering trend, and a software patching trend. Examples of technical indicators 102 on an entity level may include measurables related to use of a software-as-a-service bill of materials (SaaSBOM) including a measure of vulnerable technologies detected, vulnerabilities detected, an average common vulnerabilities and exposures (CVE) base score, an average CVE exploitability score, and an average CVE impact score; and a measure of threat actors including attack techniques detected, advanced persistent threat (APT) threats detected, and an average APT group score. Examples of technical indicators 102 on an entity level may include a measure of data loss events including a measure of data loss in a last 6 months, data loss in a last 6-12 months, data loss in a last 12-24 months, data loss in a last 24-36 months, and data loss in a last 36 plus months; and a measure of cyber attack events including a measure of ransomware attacks, a measure of wiper malware attacks, a measure of unspecified cyberattacks, and a measure of anomalous cyber indicators. Examples of technical indicators 102 on an entity level may include an overall compliance measure including a measure of cybersecurity framework (CSF) compliance, a measure of International Organization for Standardization and an International Electrotechnical Commission (ISO/IEC) 27001 compliance, a measure of National Institute of Science and Technology Special Publication 800-53 (NIST SP 800-53) compliance, a measure of National Institute of Science and Technology Special Publication 800-171 (NIST SP 800-171) compliance, and a measure of Payment Card Industry Data Security Standard (PCI DSS) compliance. The technical indicators may include one, a plurality, or every one of the entity level factors described herein.

A plurality of technical indicators 102 on a country-level may be described. Examples of technical indicators 102 on a country level may include measures of governance including measures of domestic government coordination, legal institutional capacity, cyber strategy and policy maturity, cybercrime prosecution capacity, military cyber capacity, cyber policy implementation, and cyber intelligence analysis capacity. Examples of technical indicators 102 on a country level may include measures of a business environment in the country, including measures of private sector digital services data protection, digital protection of essential services, personal data protection, digital identity protection and compliance, domestic spyware, government mandated data access, and Internet blackouts. Examples of technical indicators 102 on a country level may include measures of resilience, including measures of government technical capacity, security culture maturity, cyber crisis management capacity, cyber incident response capacity, and cyber education and professional development. Examples of technical indicators 102 on a country level may include measures of threats including a measure of a most-attacked country or countries in a region, a prevalence of phishing attacks in the country, and an advanced persistent threat risk; and measures of digital infrastructure present in the country, including a measure of Internet penetration, information and communication technology infrastructure capacity, root-server diversification, submarine cable diversification, mobile connectivity, satellite diversification, data center diversification, Internet exchange diversification, and cloud infrastructure capacity. Examples of technical indicators 102 on a country level may include measures of international collaboration, including an indication of whether the country is a member of a Budapest Convention on Cybercrime, whether the country is a signatory on a Declaration for the Future of the Internet, whether the country is a member of a Freedom Online Coalition, and participation in an International Cybersecurity Forum.

The technical indicators 102 may include a measure of a binary indication selected to indicate or predict cybersecurity health or hygiene. In the case of the exemplary web encryption certificate expiration date, for instance, if the encryption certificate a company uses on some of its servers is expired, the company is more susceptible to a cyber-attack than a similar company with an active certificate. One could similarly include a measure whether the certificate is within one week of expiration, one month, 6 months, etc. of expiration.

The undisclosed cyber event tabulation module 100 receives the technical indicator(s) 102 as an input. The undisclosed cyber event tabulation module 100 includes a neural network 110. The neural network 110 may include a deep neural network, a convolutional neural network (CNN), or other similar neural network operators or operations. The neural network 110 may apply a machine learning algorithm methodology to tune or make more accurate an output or outputs based upon one or more inputs provided to the neural network 110. The neural network 110 is trained, with training data 106 being provided to the neural network 110. The training data 106 may include historical data from a plurality of servers being operated by a plurality of entities in an industry or commercial segment and may include a plurality of inputs similar to or matching the technical indicators 102 and outputs matching a neural network output 112 of the neural network 110. Variations in the inputs of the training data 106 matched with variations in the outputs of the training data 106 are utilized to train or condition the neural network 110 to provide a neural network output 112 based upon the technical indicator(s) 102 provided to the neural network 110 as inputs. The neural network 110 may receive as an additional input or may define through its programming a time period over which to provide an output and is configured to provide a prediction in the form of the neural network output 112 based upon the input of the technical indicators 102 which imitate or are derived from input/output relationships in the training data 106. The training data 106 may be updated over time, for example, with data from a plurality of servers in the industry providing actual results as new cyber-attack methods are employed by bad actors or as new cybersecurity measures are implemented. The training data 106 may include or be augmented by historical feedback 114 from operation of the undisclosed cyber event tabulation module 100, with actual results of the undisclosed cyber event tabulation module 100 and/or programmed grading or effectiveness ratings being entered by a human programmer being used to improve future predictions. Once the neural network 110 is trained with the training data 106, the neural network 110 may be described as a trained neural network and may be utilized to provide the neural network output 112 based upon the technical indicators 102 provided as the input. The neural network output 112 may be described as a prediction of cyber events that occurred on the second server 30 or experienced by the second entity 31 over a time period.

The undisclosed cyber event tabulation module 100 further receives a report of a reported number of cyber-attacks upon the server of the second entity 104 over the time period as an additional input. The report of the reported number of cyber-attacks upon the server of the second entity 104 is provided to a summing operator 120, which compares the neural network output 112 providing the prediction of cyber events that occurred on the second server 30 or experienced by the second entity 31 over the time period to the reported number of cyber events upon the server of the second entity 104 over the time period. This comparison, subtracting the reported value from the neural network output 112, yields or generates an output of a predicted unreported number of cyber events 122 that occurred over the time period.

A number of different processes may be utilized to generate the training data 106 useful to train the neural network 110. According to one embodiment, a process to generate training data 106 begins by inputting or monitoring a) a first panel-structured dataset containing real-world (non-synthetic) historical cybersecurity covariates/features observed for arbitrarily many entities, with each entity containing two or more observations on the set of covariates/features at each of a plurality of unique date-times, and b) a second panel-structured dataset containing entity and date-time information for different cyber events of interest (e.g. ransomware attacks, wiper malware attacks, etc.) An exemplary first panel-structured dataset may include a two-dimensional table including a plurality of covariate feature values (for example, ranking cybersecurity measures taken by the particular entity at the specific date-time with value from 0 to 1) for each of the plurality of entities at each of the plurality of unique date-times. An exemplary second panel-structured dataset may include a two-dimensional table including a plurality of event occurrence values (for example, ranking occurrence of cyber events experienced the particular entity at the specific date-time with value from 0 to 1) for each of the plurality of entities at each of the plurality of unique date-times.

In a next step in the exemplary process to create the training data 106, a composite set of the training data 106 may be generated by utilizing one of or combining three different approaches. The provided approaches may be used in isolation of each other to create a training dataset. Alternatively, the provided approaches may be used in combination, with the results of each approach combined to create a single composite training dataset.

The first approach is an empirical approach, where the real-world (non-synthetic) dataset noted above is split into two subsets. Data from the second panel-structured dataset related to occurrence of cyber events may be used to sort data from the first panel-structured dataset into the two subsets. One subset may contain observations of a positive class, defined as observations for entities at date-times corresponding to known cyber events of interest (e.g., a ransomware attack, a wiper malware attack, etc.) The other subset may contain observations of a negative class, defined as observations for entities at date-times corresponding to no known cyber events of interest. In one embodiment, wherein N represents ranked cybersecurity measures, K represents entities, and T represent date-times, the first approach may be described as starting with empirical cybersecurity data [N, K, T], isolating entities with cyber events of interest as a positive class [N, $\alpha<K$, T], and isolating entities without cyber events of interest as a negative class [N, K$-\alpha>0$, T].

The second approach generates unstructured synthetic (simulated) data by training a generative adversarial network (GAN) to create an arbitrarily large set of entity date-time covariate/feature observations that share the empirical properties of the real-world (non-synthetic) data. Two GANs are trained—one against the subset of real-world (non-synthetic) data containing only observations of the positive class, and the other against the subset of real-world (non-synthetic) data containing only observations of the negative class. In one embodiment, the second approach may be described as starting with empirical cybersecurity data [N, K, T], isolating entities with cyber events of interest as a positive class [N, $\alpha<K$, T], processing the positive class output with a first GAN to create unstructured synthetic cybersecurity data [N, $\gamma$, T] (positive class), isolating entities without cyber events of interest as a negative class [N, K$-\alpha>0$, T], and processing the negative class output with a second GAN to create unstructured synthetic cybersecurity data [N, $\delta$, T] (negative class).

The third approach uses modeling/theory to generate a structured synthetic (simulated) dataset. A structural model is developed to simulate how the real-world (non-synthetic) cybersecurity covariates/features would behave over time during an arbitrary set of cyber events of interest. The structural model first generates synthetic data from an overview, where all covariates/features for each simulated entity are observed across a wide timespan or at all possible date-times. The structural model then obfuscates certain feature-date-time observations to mimic the expected observation cadence of the true underlying model generating the real-world (non-synthetic) data. The structural model only generates synthetic (simulated) covariate/feature observations of the positive class. The positive class and negative class covariate/feature observations generated by the three approaches may be combined into a single composite training dataset. The third approach may be described as combining cyber event modeling theory and empirical cybersecurity data [N, K, T], processing the combination with a structural cybersecurity event data generator to generate synthetic data wherein all covariates/features for each simulated entity are observed at all possible date-times [N, θ, T=T∀n∈N] (positive class), processing the synthetic data with a structural cybersecurity event data obfuscator to generate structural synthetic cybersecurity data [N, θ, T] (positive class).

The single composite training dataset may be utilized as the training data 106 to train the neural network 110. In one embodiment, the single composite training dataset may be transformed into an image or images representing the data related to each entity. These images may be used to train the neural network 110. Accordingly, in an optional next step of the exemplary process for creating the training data 106, data for each entity in the training dataset is transformed into an image. In some embodiments, the image may be described as a pseudo image. The image may include a two-dimensional representation including a matrix of pixels or grid-cells. The pixels/grid-cells of the image are ordered in one dimension according to the date-time of each observation. The ordering of the covariate/feature observations along the other dimension is randomized or is in a randomized configuration. The value assigned to each pixel/grid-cell represents the value of a single covariate/feature for a single entity at a single unique date-time.

The individual images are mapped onto an entity-specific template image containing sufficient pixels/grid-cells to contain observations for all possible covariates/features at all unique date-time values for a single entity to create an entity-specific overview image for the entity. Covariate/feature values are filled forward with respect to time for all missing observations on each covariate/feature until either a non-missing date-time observation exists or the maximum temporal dimension position of the template image is reached. Covariate/feature values are then filled backward with respect to time for all the remaining missing observations on each covariate/feature until either a non-missing date-time observation exists or the minimum temporal dimension position of the template image is reached. Once complete, the filled in template image may be described as the overview image for the entity. Sub-classes of the overview image may also be generated that correspond to different temporal windows (e.g., all observations over 1 day, over 1 week, over 1 month, etc.)

The training dataset of images is subset according to both a) the temporal window of the overview image, and b) the ordering of the covariates/features along the nontemporal dimension. Each subset is then used to train a separate convolutional neural network (CNN). These plurality of CNNs may be described as a plurality of candidate CNNs. Operation of each of the plurality of candidate CNNs may be evaluated to determine a best-performing CNN. The training data subset giving rise to the best-performing CNN (according to one or more arbitrary evaluation metrics, such as precision, recall, etc.) is selected for additional training and supplemented by the other observations after being reformatted to conform to the length of the subset's temporal dimension and the ordering of its covariates/features along the non-temporal dimension. The output of this final, fully trained CNN is a probability that a given entity experienced one or more of the selected cyber events of interest during the time interval spanned by the observation window. For entities that have a known, fully disclosed cyber event present in the observation window, the model's probability output is zeroed out. The resulting probabilities represent the likelihood that an entity experienced and did not fully disclose one or more of the selected cyber events of interest during the time interval spanned by the observation window. In one embodiment, generation of the resulting probabilities may be described as starting with empirical cybersecurity data [N, K, T], removing entity and temporal windows with disclosed cybersecurity events to create a subset, empirical cybersecurity data [N, K, T] (only known negative class), and applying an undisclosed cyber event classifier to create undisclosed cyber event predictions.

Figure 4:
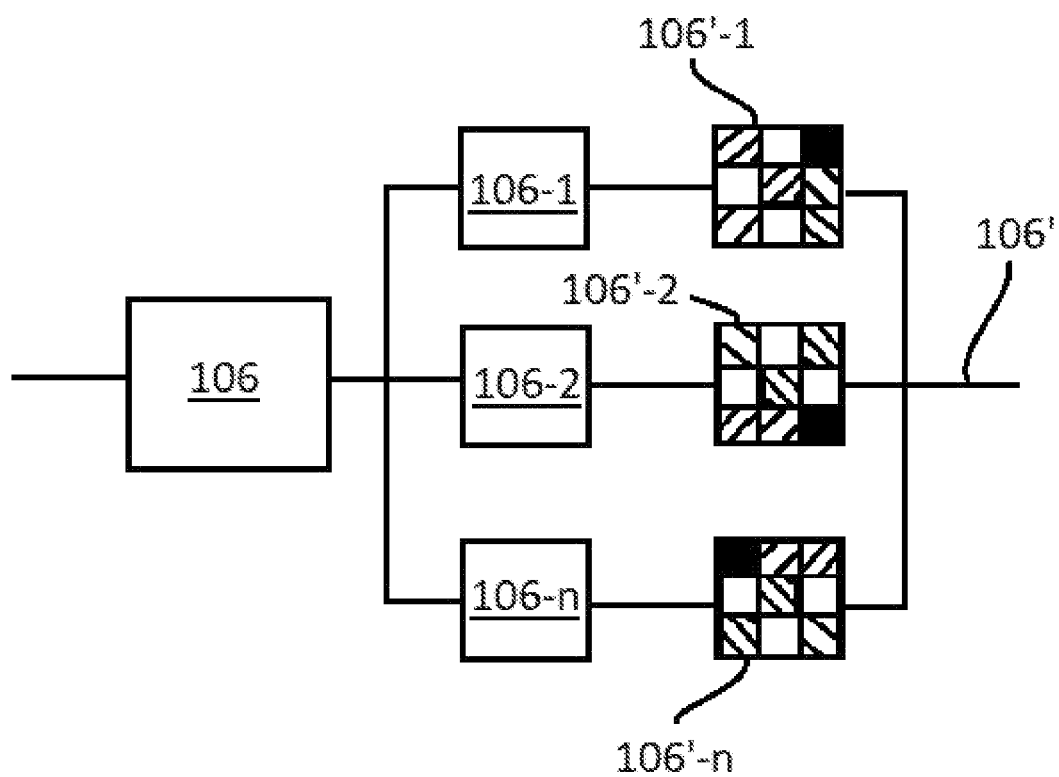
FIG. 4 schematically illustrates an exemplary optional operation to the transform training data of FIG. 3 into a plurality of images useful to train the neural network, in accordance with the present disclosure.

FIG. 4 schematically illustrates an exemplary optional operation to the transform training data 106 of FIG. 3 into a plurality of images 106' useful to train the neural network 110. The training data 106 may be segmented or divided into a plurality of trained data sets 106-1, 106-2, 106-n, with the trained data sets being grouped into a total number of data sets n. Each of the trained data sets 106-1, 106-2, 106-n may include information, for example, describing operation of one of a plurality of servers operated by one of a plurality of entities through a time period and an output or a set of outputs describing cyber events that were experienced by the entity through that time period. For ease of processing and speed, the neural network 110 may be trained to receive training inputs as a series of images. The trained data sets 106-1, 106-2, 106-n may be converted or transformed into representative images 106'-1, 106'-2, 106'-n. Each of the representative images 106'-1, 106'-2, 106'-n correspond to one of the trained data sets 106-1, 106-2, 106-n. The representative images 106'-1, 106'-2, 106'-n may collectively be described as the plurality of images 106' useful to train the neural network 110. The representative images 106'-1, 106'-2, 106'-n may include shading, intensity, color, etc. which are configured to convey information in each of the corresponding trained data sets 106-1, 106-2, 106-n.

Figure 5:
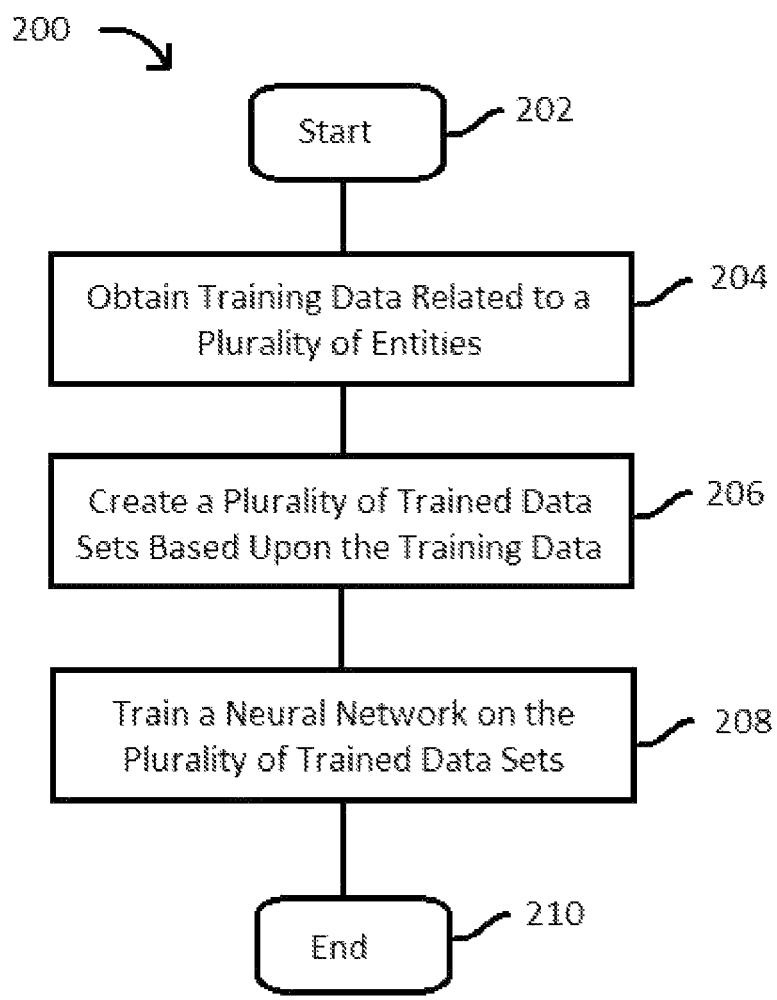
FIG. 5 is a flowchart illustrating a first exemplary method to train a neural network of the undisclosed cyber event tabulation module of FIG. 3, in accordance with the present disclosure.

FIG. 5 is a flowchart illustrating a first exemplary method to train a neural network of the undisclosed cyber event tabulation module of FIG. 3. For purposes of illustration, the method 200 is described in relation to the computerized processor 24 of FIG. 3, although the method 200 may be operated on other similar computerized devices. In the exemplary embodiment of method 300, the neural network 110 is embodied as a deep neural network. The method 200 starts at step 202. At step 204, training data 106 related to a plurality of entities, in particular, including historical indications of measures of cyber-health of the plurality of entities and information related to a total number of cyber events experienced by the plurality of entities, is obtained or received as an input to the undisclosed cyber event tabulation module 100. At step 206, the training data 106 is utilized to create a plurality of trained data sets including information useful to train the neural network 110. At step 208, the neural network 110 is trained using the trained data sets to create a trained neural network. At step 210, the method 200 ends. The method 200 is an exemplary method to train the neural network 110. A number of additional and/or alternative method steps are envisioned, and the disclosure is not intended to be limited to the examples provided herein.

Figure 6:
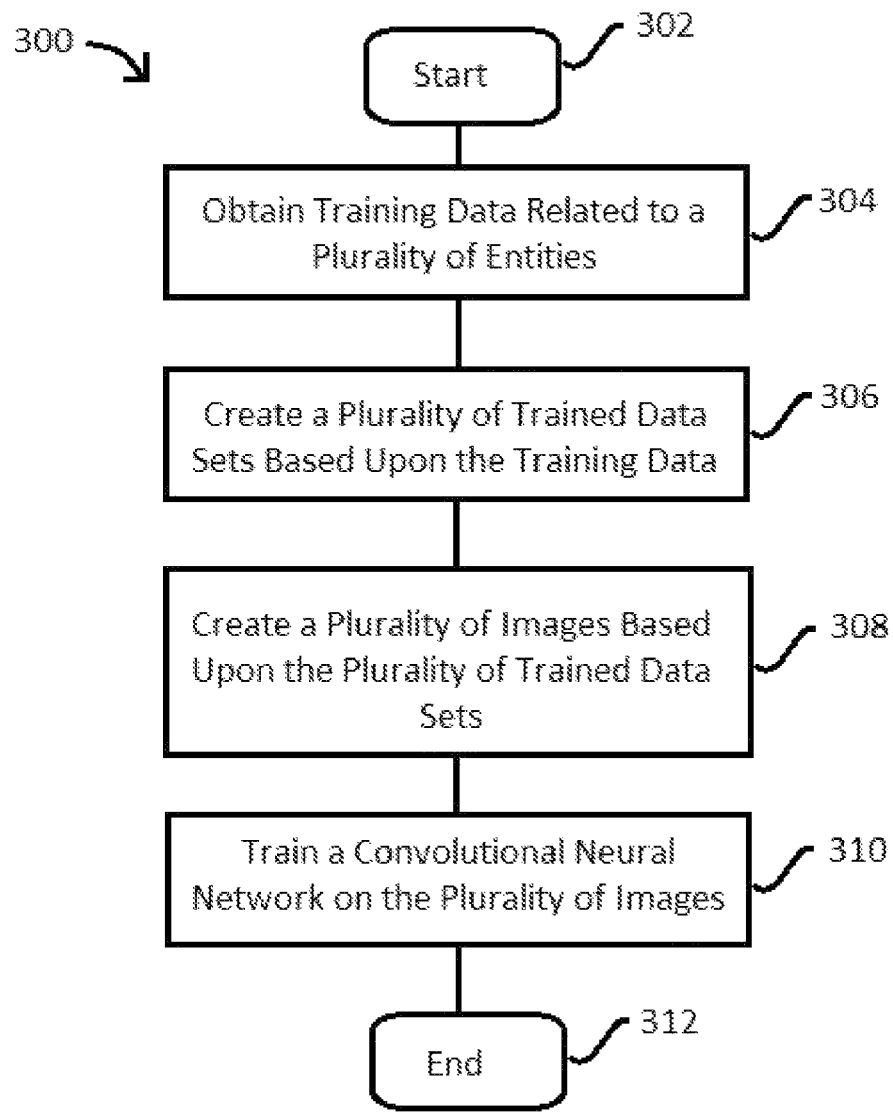
FIG. 6 is a flowchart illustrating a second exemplary method to train a neural network of the undisclosed cyber event tabulation module of FIG. 3, in accordance with the present disclosure.

FIG. 6 is a flowchart illustrating a second exemplary method 300 to train the neural network 110 of the undisclosed cyber event tabulation module 100 of FIG. 3. For purposes of illustration, the method 300 is described in relation to the computerized processor 24 of FIG. 3 and the creation of representative images 106'-1, 106'-2, 106'-n as described in relation to FIG. 4, although the method 300 may be operated on other similar computerized devices and with other forms of training inputs. In the exemplary embodiment of method 300, the neural network 110 is embodied as a convolutional neural network. The method 300 starts at step 302. At step 304, training data 106 related to a plurality of entities, in particular, including historical indications of measures of cyber-health of the plurality of entities and information related to a total number of cyber events experienced by the plurality of entities, is obtained or received as an input to the undisclosed cyber event tabulation module 100. At step 306, the training data 106 is utilized to create a plurality of trained data sets 106-1, 106-2, 106-n including information useful to train the neural network 110. At step 308, a plurality of representative images 106'-1, 106'-2, 106'-n is created, wherein each one of the plurality of representative images 106'-1, 106'-2, 106'-n is created based upon one of the plurality of trained data sets 106-1, 106-2, 106-n. The plurality of representative images 106'-1, 106'-2, 106'-n, for purpose of illustration, is provided as three-by-three pixels with varying shading and intensity. The plurality of representative images 106'-1, 106'-2, 106'-n may be images of varying size and complexity, with varying numbers of pixels as required to embody the information to be conveyed. At step 310, the neural network 110 is trained using the representative images 106'-1, 106'-2, 106'-n to create a trained neural network. At step 312, the method 300 ends. The method 300 is an exemplary method to train the neural network 110. A number of additional and/or alternative method steps are envisioned, and the disclosure is not intended to be limited to the examples provided herein.

Figure 7:
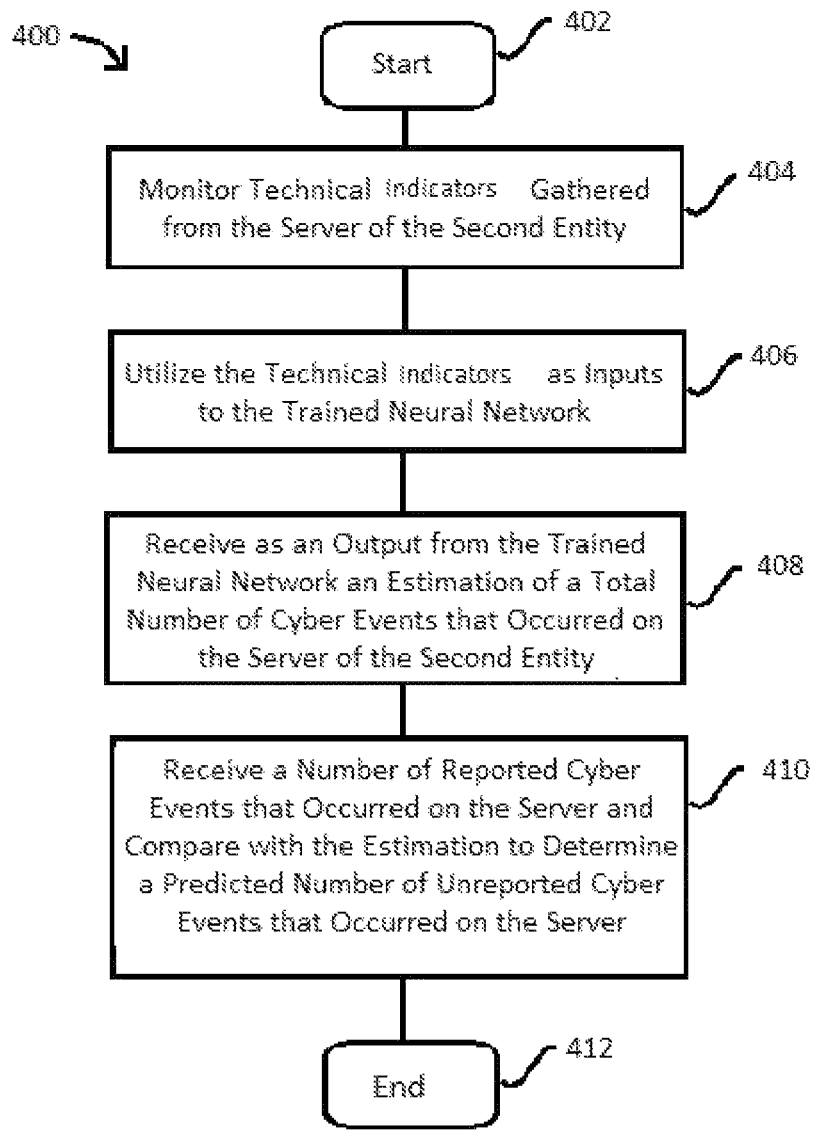
FIG. 7 is a flowchart illustrating an exemplary method to use a trained neural network of the undisclosed cyber event tabulation module of FIG. 3 to predict a number of unreported cyber events that occurred on the server of the second entity, in accordance with the present disclosure.

FIG. 7 is a flowchart illustrating an exemplary method 400 to use the neural network 110 of the undisclosed cyber event tabulation module 100 of FIG. 3 as a trained neural network to predict a number of unreported cyber events that occurred on the second server 30 or experienced by the second entity 31. For purposes of illustration, the method 400 is described in relation to the computerized processor 24 of FIG. 3, although the method 400 may be operated on other similar computerized devices. The method 400 starts at step 402. At step 404, a technical indicator(s) 102 for a time period is monitored or received by the undisclosed cyber event tabulation module 100. At step 406, the technical indicator 102 is provided as an input to the trained neural network. At step 408, the trained neural network provides and the undisclosed cyber event tabulation module 100 receives as a neural network output 112 from the trained neural network an estimation or prediction of a total number of cyber events that occurred on the second server 30 over the time period. At step 410, the undisclosed cyber event tabulation module 100 receives as an input the reported number of cyber events upon the server of the second entity 104 that occurred over the time period and compares the actually reported number to the predicted total number of cyber events that occurred on the second server 30 to determine a predicted unreported number of cyber events 122 that occurred on the second server 30 over the time period. This predicted unreported number of cyber events 122 that occurred on the second server 30 over the time period may be subsequently tabulated, reported, compared with similar predictions for other entities, or utilized in subsequent estimations or predictions. The method 400 is an exemplary method to utilize the trained neural network embodied as neural network 110 of FIG. 3. A number of additional and/or alternative method steps are envisioned, and the disclosure is not intended to be limited to the examples provided herein.

The methods and processes herein are described as being useful to make predictions about a server of a second entity 30 of FIG. 2. In another embodiment, the second entity may operate a plurality or servers, or the second entity may be a complex enterprise or network of enterprises. Method steps disclosed herein to evaluate operation of a server 30 may be duplicated or expanded across multiple servers to evaluate the cyber health of the entire second entity 31. The disclosed methods and processes may be utilized to judge or make predictions about entities or groups of entities of varying scale and complexity and is not intended to be limited to usage associated with single servers.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A computer-implemented method for detection of unreported cyber events experienced by an entity of interest, comprising:
   obtaining training data related to historical cyber health of a plurality of entities, wherein each of the plurality of entities includes a company or organization, and wherein obtaining the training data includes obtaining cybersecurity data for each of the plurality of entities and transforming the cybersecurity data for each of the plurality of entities into a plurality of images, wherein each image is configured for conveying the cybersecurity data for one of the plurality of entities;
   training a neural network on the plurality of images of the training data to create a trained neural network;
   utilizing the trained neural network to generate a predicted number of cyber events experienced by the entity of interest during a time period;
   monitoring a reported number of cyber events experienced by the entity of interest during the time period; and
   generating a predicted unreported number of cyber events experienced by the entity of interest during the time period based upon comparing the predicted number of cyber events experienced by the entity of interest during the time period to the reported number of cyber events experienced by the entity of interest during the time period.

2. The computer-implemented method of claim 1, wherein the neural network includes a deep neural network or a convolutional neural network.

3. The computer-implemented method of claim 1, wherein obtaining the cybersecurity data for each of the plurality of entities includes:
   receiving a dataset including real-world historical cybersecurity data including covariates/features observed for each of the plurality of entities; and
   utilizing the dataset as the cybersecurity data.

4. The computer-implemented method of claim 1, wherein obtaining the cybersecurity data for each of the plurality of entities includes:
   receiving a first dataset including real-world historical cybersecurity data including covariates/features observed for each of the plurality of entities;

receiving a second dataset including historical cyber events that occurred to each of the plurality of entities; and utilizing the second dataset to sort the first dataset into to subsets including:
- a first subset describing a positive class including a first portion of the real-world historical cybersecurity data corresponding to periods wherein cyber events occurred;
- a second subset describing a negative class including a second portion of the real-world historical cybersecurity data corresponding to periods wherein no known cyber event occurred;

creating a single composite training dataset based upon the first subset and the second subset; and utilizing the single composite training dataset as the cybersecurity data.

5. The computer-implemented method of claim 1, wherein obtaining the cybersecurity data for each of the plurality of entities includes:
receiving a first dataset including real-world historical cybersecurity data including covariates/features observed for each of the plurality of entities;
receiving a second dataset including historical cyber events that occurred to each of the plurality of entities;
utilizing the second dataset to sort the first dataset into to subsets including:
- a first subset describing a positive class including a first portion of the real-world historical cybersecurity data corresponding to periods wherein cyber events occurred; and
- a second subset describing a negative class including a second portion of the real-world historical cybersecurity data corresponding to periods wherein no known cyber event occurred;

training a first generative adversarial network to create a first simulated set of entity date-time covariate/feature observations configured to share empirical properties with the first subset;

training a second generative adversarial network to create a second simulated set of entity date-time covariate/feature observations configured to share empirical properties with the second subset;

creating a single composite training dataset based upon the first simulated set of entity date-time covariate/feature observations and the second simulated set of entity date-time covariate/feature observations; and utilizing the single composite training dataset as the cybersecurity data.

6. The computer-implemented method of claim 1, wherein obtaining the cybersecurity data for each of the plurality of entities includes:
receiving a first dataset including real-world historical cybersecurity data including covariates/features observed for each of the plurality of entities;
generating a structured synthetic dataset based upon modeling to mimic the first dataset across a timespan; and
utilizing the structured synthetic dataset as the cybersecurity data.

7. The computer-implemented method of claim 1, wherein obtaining the cybersecurity data for each of the plurality of entities includes:
receiving a first dataset including real-world historical cybersecurity data including covariates/features observed for each of the plurality of entities;
receiving a second dataset including historical cyber events that occurred to each of the plurality of entities;
utilizing the second dataset to sort the first dataset into to subsets including:
- a first subset describing a positive class including a first portion of the real-world historical cybersecurity data corresponding to periods wherein cyber events occurred; and
- a second subset describing a negative class including a second portion of the real-world historical cybersecurity data corresponding to periods wherein no known cyber event occurred;

training a first generative adversarial network to create a first simulated set of entity date-time covariate/feature observations configured to share empirical properties with the first subset;

training a second generative adversarial network to create a second simulated set of entity date-time covariate/feature observations configured to share empirical properties with the second subset;

generating a structured synthetic dataset based upon modeling to mimic the first dataset across a timespan;

creating a single composite training dataset based upon the first subset, the second subset, the first simulated set of entity date-time covariate observations, the second simulated set of entity date-time covariate observations, and the structured synthetic dataset; and utilizing the single composite training dataset as the cybersecurity data.

8. The computer-implemented method of claim 1, wherein transforming the cybersecurity data for each of the plurality of entities into the plurality of images includes creating a plurality of individual images for each of the plurality of entities, including:
ordering cybersecurity data in a first dimension according to a date-time of each observation; and
ordering covariate/feature observations along a second dimension in a random configuration.

9. The computer-implemented method of claim 8, wherein transforming the cybersecurity data for each of the plurality of entities into the plurality of images further includes mapping the plurality of individual images for each of the plurality of entities onto an entity-specific template image to create an entity-specific overview image for each of the plurality of entities; and
wherein utilizing the plurality of images to train the neural network includes utilizing the entity-specific overview image for each of the plurality of entities to train the neural network.

10. The computer-implemented method of claim 9, wherein utilizing the entity-specific overview image for each of the plurality of entities to train the neural network includes:
creating a subset of each entity-specific overview image based upon a temporal window of the overview image and the ordering of the covariates/feature observations along the second dimension;
utilizing the subset of each entity-specific overview image to train one of a plurality of candidate convolutional neural networks;
evaluating operation of each of the plurality of candidate convolutional neural networks; and
selecting one of the plurality of candidate convolutional neural networks as the trained neural network based upon the evaluating.

11. The computer-implemented method of claim 1, wherein utilizing the trained neural network includes:
monitoring a technical indicator describing a measure of cyber health of the entity of interest; and providing the technical indicator to the trained neural network as an input.

12. The computer-implemented method of claim 11, wherein the technical indicator includes one or more if the following:
- a binary indication selected to indicate cybersecurity health;
- a measure of whether a web encryption certificate expiration date for a server operated by entity of interest has passed;
- a measure of whether a web encryption certificate expiration data for the server operated by entity of interest is within one week of expiration, within one month of expiration, or within six months of expiration;
- a measure of domain name system (DNS) security upon the server operated by entity of interest including domain hijacking prevention measures;
- a measure of email security upon the server operated by entity of interest including email authentication measures or email encryption measures;
- a measure of network filtering measures upon the server operated by entity of interest including measures to avoid unsafe network services or presence of internet of things (IoT) devices;
- a measure of software patching upon the server operated by entity of interest including application server patching, open secure sockets layer (OpenSSL) patching, content management system (CMS) patching, or web server patching;
- a measure of system hosting upon the server operated by entity of interest including hosting fragmentation;
- a measure of threat intelligence monitoring upon the server operated by entity of interest including monitoring data regarding botnet hosts, monitoring data regarding command-and-control servers, monitoring data regarding host hacking, monitoring data regarding host scanning, monitoring data regarding host phishing, monitoring data regarding host spamming, or monitoring data regarding host blacklisting;
- a measure of web encryption upon the server operated by entity of interest including a certification expiration date, a certificate valid date, a certificate subject, an encryption hash algorithm, an encryption key length, or encryption protocols;
- a measure of web application security upon the server operated by entity of interest including CMS authentication, hypertext transfer protocol (HTTP) security headers, or malicious code;
- a trend-describing measurable monitored upon the server operated by entity of interest including a DNS security trend, a threat intelligence trend, an email security trend, a system hosting trend, a web encryption trend, a web application security trend, a network filtering trend, or a software patching trend;
- a measurable related to use of a software-as-a-service bill of materials (SaaSBOM) upon the server operated by entity of interest including a measure of vulnerable technologies detected, a measure of vulnerabilities detected, an average common vulnerabilities and exposures (CVE) base score, an average CVE exploitability score, or an average CVE impact score;
- a measure of threat actors interacting with the server operated by entity of interest including a measure of attack techniques detected, a measure of advanced persistent threat (APT) threats detected, or an average APT group score;
- a measure of data loss events including a measure of data loss in a last 6 months, a measure of data loss in a last 6-12 months, a measure of data loss in a last 12-24 months, a measure of data loss in a last 24-36 months, or a measure of data loss in a last 36 plus months;
- a measure of cyber events including a measure of occurrence of ransomware attacks, a measure of occurrence of wiper malware attacks, a measure of occurrence of unspecified cyberattacks, or a measure of occurrence of anomalous cyber indicators;
- an overall compliance measure including a measure of cybersecurity framework (CSF) compliance, a measure of International Organization for Standardization and an International Electrotechnical Commission (ISO/IEC) 27001 compliance, a measure of National Institute of Science and Technology Special Publication 800-53 (NIST SP 800-53) compliance, a measure of National Institute of Science and Technology Special Publication 800-171 (NIST SP 800-171) compliance, or a measure of Payment Card Industry Data Security Standard (PCI DSS) compliance;
- a measure of governance affecting the server operated by entity of interest including measures of domestic government coordination, legal institutional capacity, cyber strategy and policy maturity, cybercrime prosecution capacity, military cyber capacity, cyber policy implementation, or cyber intelligence analysis capacity;
- a measure of a business environment in a country in which the server operated by entity of interest operates including measures of private sector digital services data protection, digital protection of essential services, personal data protection, digital identity protection and compliance, domestic spyware, government mandated data access, or Internet blackouts;
- a measure of resilience of the country in which the server operated by entity of interest operates including measures of government technical capacity, security culture maturity, cyber crisis management capacity, cyber incident response capacity, or cyber education and professional development;
- a measure of digital infrastructure present in a country in which the server operated by entity of interest operates including a measure of Internet penetration, a measure of information and communication technology infrastructure capacity, a measure of rootserver diversification, a measure of submarine cable diversification, a measure of mobile connectivity, a measure of satellite diversification, a measure of data center diversification, a measure of Internet exchange diversification, or a measure of cloud infrastructure capacity; or
- a measure of international collaboration affecting the server operated by entity of interest, including an indication of whether country in which the server operated by entity of interest operates is a member of a Budapest Convention on Cybercrime, whether the country is a signatory on a Declaration for the Future of the Internet, whether the country is a member of a Freedom Online Coalition, and whether the country participates in an International Cybersecurity Forum.

13. The computer-implemented method of claim 1, wherein utilizing the trained neural network includes:
monitoring a plurality of technical indicators describing measures of cyber health of the entity of interest; and
providing the technical indicators to the trained neural network as an input.

14. The computer-implemented method of claim 1, wherein unreported cyber events experienced by the entity of interest include cyber-attacks including phishing, ransomware, malware, denial-of-service, or man-in the middle attacks.

15. The computer-implemented method of claim 1, further comprising the entity of interest operating a computerized server device;
 wherein utilizing the trained neural network to generate the predicted number of cyber events experienced by the entity of interest during the time period includes utilizing the trained neural network to generate a predicted number of cyber events that occurred on the computerized server device during the time period;
 wherein monitoring the reported number of cyber events experienced by the entity of interest during the time period includes monitoring a reported number of cyber events that occurred on the computerized server device during the time period; and
 wherein generating the predicted unreported number of cyber events experienced by the entity of interest during the time period includes generating a predicted unreported number of cyber events that occurred on the computerized server device during the time period.

16. The computer-implemented method of claim 1, wherein the neural network is operated on a first computerized server device operated by a first entity;
 wherein the entity of interest is a second entity; and
 wherein the predicted unreported number of cyber events experienced by the entity of interest during the time period is configured for enabling the first entity to judge a risk that the second entity poses to the first entity.

17. The computer-implemented method of claim 1, further comprising feeding back historical iterations of the method to further train the neural network.

18. The computer-implemented method of claim 1, further comprising iteratively training the neural network with updated training data.

19. A non-transitory computer-readable medium, comprising instructions configured to detect unreported cyber events experienced by an entity of interest, wherein the instructions, when executed by one or more processors, are configured to:
 obtain training data related to historical cyber health of a plurality of entities, wherein each of the plurality of entities includes a company or organization, and the training data includes cybersecurity data for each of the plurality of entities and the cybersecurity data for each of the plurality of entities is transformed into a plurality of images, wherein each image is configured to convey the cybersecurity data for one of the plurality of entities;
 train a neural network on the plurality of images of the training data to create a trained neural network;
 utilize the trained neural network to generate a predicted number of cyber events experienced by the entity of interest during a time period;
 monitor a reported number of cyber events experienced by the entity of interest during the time period; and
 generate a predicted unreported number of cyber events experienced by the entity of interest during the time period based upon comparing the predicted number of cyber events experienced by the entity of interest during the time period to the reported number of cyber events experienced by the entity of interest during the time period.

20. A system for detection of unreported cyber events experienced by an entity of interest, comprising:
 a computerized server device operating an undisclosed cyber event tabulation module including programming, which when executed by one or more processors, are configured to:
  obtain training data related to historical cyber health of a plurality of entities, wherein each of the plurality of entities includes a company or organization, and the training data includes cybersecurity data for each of the plurality of entities and the cybersecurity data for each of the plurality of entities is transformed into a plurality of images, wherein each image is configured for conveying the cybersecurity data for one of the plurality of entities;
  train a neural network on the plurality of images of the training data to create a trained neural network;
  utilize the trained neural network to generate a predicted number of cyber events experienced by the entity of interest during a time period;
  monitor a reported number of cyber events experienced by the entity of interest during the time period; and
  generate a predicted unreported number of cyber events experienced by the entity of interest during the time period based upon comparing the predicted number of cyber events experienced by the entity of interest during the time period to the reported number of cyber events experienced by the entity of interest during the time period.

\* \* \* \* \*